US008978526B2

(12) United States Patent
Nedzlek

(10) Patent No.: US 8,978,526 B2
(45) Date of Patent: Mar. 17, 2015

(54) CARTRIDGE WITH FINE ADJUSTMENT MEANS

(71) Applicant: Walter AG, Tubingen (DE)

(72) Inventor: Kevin Nedzlek, Jefferson, WI (US)

(73) Assignee: Walter AG, Tübingen (DE)

( * ) Notice: Subject to any disclaimer, the term of this patent is extended or adjusted under 35 U.S.C. 154(b) by 167 days.

(21) Appl. No.: 13/667,543

(22) Filed: Nov. 2, 2012

(65) Prior Publication Data

US 2013/0294853 A1   Nov. 7, 2013

Related U.S. Application Data

(60) Provisional application No. 61/628,678, filed on Nov. 4, 2011.

(51) Int. Cl.
| | | |
|---|---|---|
| B23B 29/00 | (2006.01) | |
| B23C 5/24 | (2006.01) | |
| B23C 5/08 | (2006.01) | |
| B23B 29/034 | (2006.01) | |
| B23C 5/10 | (2006.01) | |
| B23B 29/04 | (2006.01) | |

(52) U.S. Cl.
CPC ............. *B23C 5/2472* (2013.01); *B23C 5/08* (2013.01); *B23C 5/241* (2013.01); *B23B 29/03407* (2013.01); *B23B 29/03421* (2013.01); *B23C 5/109* (2013.01)
USPC ............................................. 82/161; 407/75

(58) Field of Classification Search
USPC ................. 407/46, 47, 73, 75, 83; 82/161
See application file for complete search history.

(56) References Cited

U.S. PATENT DOCUMENTS

| 3,498,164 | A | * | 3/1970 | McCue et al. ............ 82/161 |
|---|---|---|---|---|
| 3,755,868 | A | * | 9/1973 | LaForge et al. ............ 407/75 |
| 4,566,826 | A | * | 1/1986 | Dickinson ............ 407/37 |
| 4,631,994 | A | * | 12/1986 | Jester et al. ............ 82/158 |
| RE34,054 | E | * | 9/1992 | Millington et al. ............ 76/115 |
| 5,336,026 | A | * | 8/1994 | Noggle ............ 408/147 |
| 5,567,092 | A | * | 10/1996 | Post ............ 407/38 |
| 6,280,122 | B1 | * | 8/2001 | Qvarth ............ 407/36 |
| 7,549,824 | B2 | * | 6/2009 | Agic ............ 407/42 |
| 8,092,124 | B2 | * | 1/2012 | Spichtinger et al. ............ 407/39 |
| 8,475,087 | B2 | * | 7/2013 | Wihlborg et al. ............ 407/46 |
| 2004/0191008 | A1 | * | 9/2004 | Noggle et al. ............ 407/46 |
| 2005/0260045 | A1 | * | 11/2005 | Raab ............ 407/46 |

FOREIGN PATENT DOCUMENTS

| DE | 2 140 004 | 2/1973 |
|---|---|---|
| DE | 10 2006 036 765 | 2/2008 |
| WO | WO 2008/017383 | 2/2008 |

OTHER PUBLICATIONS

International Search Report for International Application No. PCT/EP2012/071556, dated Feb. 1, 2013.

\* cited by examiner

*Primary Examiner* — Will Fridie, Jr.
(74) *Attorney, Agent, or Firm* — Morgan, Lewis & Bockius LLP

(57) ABSTRACT

Cartridge for supporting at least one cutting insert and for being received on a tool body is disclosed. At least a first portion of the cartridge may be stationary mounted and the cartridge includes at least one pocket for receiving a cutting element. A coarse and a fine adjustment means are provided by means of which at least a second portion of the cartridge including the pocket may be moved with respect to the tool body and wherein the coarse and the fine adjustment means are merely provided at the cartridge.

17 Claims, 6 Drawing Sheets

CARTRIDGE WITH FINE ADJUSTMENT MEANS

Figure 2:
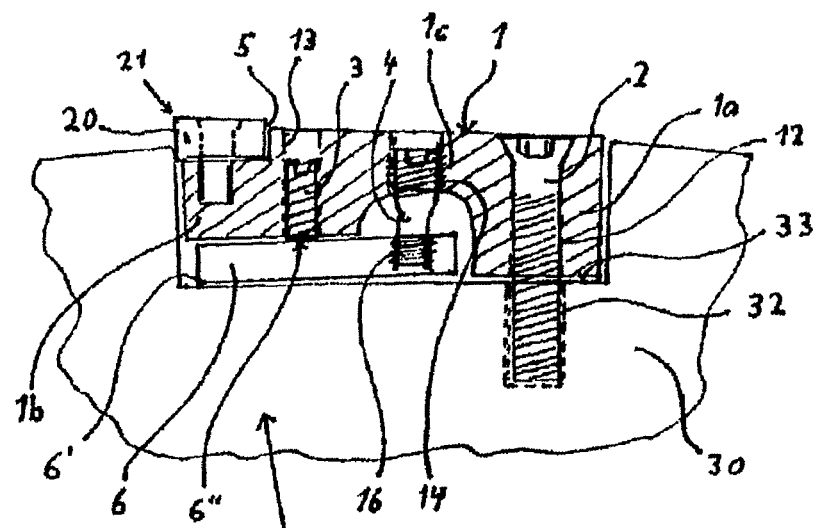

The present invention relates to a cartridge for receiving and supporting at least one cutting insert and for being received on a tool body, wherein at least a first portion of the cartridge may be fixedly mounted and the cartridge comprises at least one pocket for receiving a cutting element, and wherein a coarse and a fine adjustment means are provided by means of which at least a second portion of the cartridge comprising the pocket may be adjustably positioned with respect to the tool body.

Corresponding cartridges for the coarse and fine adjustment of the position of a cutting insert or the cutting edge of a cutting insert, which is mounted in a pocket at the cartridge, are generally known.

There exist very different solutions for the coarse and fine adjustment of such cartridges. In a lot of cases the means for coarse and fine adjustment have moveable wedges in addition to adjustment screws, whereby the wedge surface is either engaged with a portion of the cartridge or directly engaged with a cutting insert, whereby the primary adjustment direction of an adjustment screw and the moving direction of the wedge, respectively, is transformed into an adjustment movement of a cutting edge or of a corresponding portion of the cartridge along a direction which is generally perpendicular to said primary adjustment or moving direction, respectively.

Such means for coarse and fine adjustment are often provided separately and independently from the cartridge and they are at least partially or wholly provided on the tool body. In particular, the adjustment means for cartridges or cutting inserts provided on the cartridges often show specially adapted parts on the tool body such as for example threaded holes provided for adjustment screws, guiding paths for wedges etc.

This is disadvantageous in so far as cartridges then have to be adapted in a way that they engage with the adjustment means provided on the tool body. Additionally, loose parts which are separate from the tool body and the cartridge may have to be handled during mounting. This limits the configuration of the cartridges and makes the entire system, which is composed of cartridges and the tool body, expensive.

When compared to this state of the art, it is the object of the present invention to create a cartridge for supporting at least one cutting insert, including the above mentioned features, which not only provide a very precise fine adjustment of the position of the moveable cartridge portion and thus a cutting edge arranged at the cartridge portion, but which is also independent of the tool body and does not have any parts which are separate from the cartridge or need to be handled independently (with the exemption of elements fixing the cartridge on the tool body).

This object is achieved by providing the coarse and fine adjustment means merely at the cartridge.

This allows for the use of a homogenous tool body with a uniform cartridge receptacle which does not have to show features or elements for a coarse or fine adjustment, whereby the cartridge is moreover handled as a unit/assembly and may be arranged on the respective tool body and may be fixed on the tool body with only a common mounting screw or clamping device. All elements of the coarse and fine adjustment and, where appropriate, also one or more cutting insert/s may already be attached to the cartridge before fixing the cartridge at the tool body.

According to a first embodiment the coarse and fine adjustment in the preferred embodiment are independent from the stationary mounting of said at least one first portion of the cartridge.

Apart from that, such a first, stationary mounted portion does not have to be an extended part of the cartridge, but can be limited to a point on the cartridge or an axis through the cartridge, when, for example, the cartridge is pivotally mounted on the tool body. The expression "stationary" thereby makes reference to the mounting on the tool body.

Such a cartridge configuration allows to provide a uniform interface with a corresponding tool body despite very different requirements to be met by the tool and different configurations of the cartridge with respect to the arrangement and form of the cutting insert pocket and the configuration of the coarse or fine adjustment, whereby the tool body may generally receive any other kind of cartridge regardless of whether it has coarse and fine adjustment means and the cartridge according to the invention may be particularly provided as replacement cartridge for more simple cartridges which do not provide a corresponding coarse and fine adjustment means, but maybe only one single adjustment means.

Since any means for the coarse and fine adjustment are part of the cartridge itself, it is not necessary to provide any special means for this purpose at the tool body. The tool body can be configured in a very simple way and show corresponding simple interfaces with a cartridge which interfaces can for example be provided as a simple cavity at an outer surface of the tool body which, if appropriate, may have a threaded hole or other means to fix the cartridge at the bottom or the wall of the cavity or on any other surface of the tool body.

Thereby it is useful that the coarse and fine adjustment is independent from the stationary fixing or mounting of a portion of the cartridge. In other words, the means serving a stationary mounting of the cartridge or a stationary mounted portion of a cartridge on the tool body have no function for the coarse and/or fine adjustment of the moveable portion of the cartridge with respect to the tool body.

According to an embodiment of the invention there is provided a differential screw for the fine adjustment of the moveable portion of the cartridge and more precisely of the cutting edge of a cutting insert being disposed in the pocket of a moveable portion of the cartridge. One end of the differential screw engages with a thread of a moveable portion of the cartridge and the other threaded portion of which engages with a thread of another element serving as a support.

In one embodiment, there is also provided a corresponding adjustment screw for the coarse adjustment, which is screwed into a thread of the moveable portion of the cartridge and which is bearing or thrusting against a support outside of the moveable portion.

In a further embodiment of the invention the axis of the coarse adjustment screw and the axis of the differential screw provided for fine adjustment run parallel and these axes essentially define the adjustment direction of the moveable portion of the cartridge and also of the cutting edge of a cutting insert being fixed thereto.

Further, according an embodiment of the invention, the stationary mounted portion of the cartridge and the moveable portion of the cartridge are connected via a bridge having a substantially smaller material cross-section than the stationary mountable portion and thus allow for an elastic displacement of the moveable portion being connected with stationary portion via the bridge.

In an embodiment of the invention, the fine adjustment is additionally transmitted via a lever. One of the threads of the differential screw may be engaged with a threaded hole at one end of the lever, which in turn is supported by one surface of the tool body with its other end, wherein a point between both ends of the lever serves as abutment for the moveable portion of the cartridge. In particular, the moveable portion of the cartridge may be supported via the coarse screw engaging this abutment point of the lever.

In an embodiment the stationary mountable portion of the cartridge may have a fixing hole through which a corresponding screw extends, which in turn is in engagement with the thread of a threaded hole being provided in the tool body.

In an embodiment, the cartridge has (at least) two threaded holes, a first of which is arranged adjacent to the pocket at the moveable portion of the cartridge and away from the stationary mountable portion, whereas the second threaded hole is arranged between the first threaded hole and a stationary mountable portion, or even at the stationary mountable portion of the cartridge. Further bores and especially threaded holes may additionally be provided through said cartridge.

In a variant, the first threaded hole being adjacent to the pocket is provided for a coarse adjustment screw, whereas the second threaded hole is provided for one of the threads of a differential screw serving for the fine adjustment.

This embodiment is particularly useful in connection with a lever being arranged between the abutment surface of the tool body and the moveable portion of the cartridge such that the moveable portion is moveable via the lever through direct or indirect contact therewith. A coarse adjustment screw provided at the moveable portion may therefore be supported by the lever serving as abutment for the coarse adjustment screw.

It may be useful if the lever in turn also has a threaded hole for receiving a threaded portion of the differential screw, whereby this threaded hole is provided adjacent to a first end of the lever, which therefore is moveable by the differential screw. The other second end of the lever may be supported by the tool body, while the coarse adjustment screw in turn is supported by the lever at a point between the second end of the lever and the threaded hole at the first end of the lever.

For mounting the cartridge according to the invention, at first only the stationary mountable portion of the cartridge is mounted stationary at the tool body for example by means of a mounting screw which penetrates a mounting hole of a stationary mountable portion of the cartridge and engages with a thread of the tool body. Therewith, mounting of the cartridge is already completed.

The moveable portion of the cartridge may at first be moved by means of coarse adjustment in a way that the cutting edge of a cutting insert being received in a pocket at the moveable portion of the cartridge has reached about the desired position with respect to the tool body. Thereafter the fine adjustment is used in order to adjust the position of the cutting edge more precisely.

In an embodiment this takes place by using a coarse adjustment screw after mounting the stationary portion, the coarse adjustment screw being supported by a middle portion of a lever, whereby the lever is arranged between an abutment surface of a tool body and the moveable portion of the cartridge and the second end of which is supported by an abutment surface of the tool body, whereas the other (first) end of the lever is connected with the cartridge via a differential screw such that the lever is completely fixed with respect to the cartridge and the tool body by retaining or supporting both ends of the lever in a common direction through abutment at the tool body on the one hand and through the fine adjustment screw on the other hand. At the same time, the coarse adjustment screw presses on a portion of the lever being disposed between the ends in the opposite direction, thereby pushing the moveable portion of the cartridge and thus the cutting edge away from the lever, keeping them at a certain distance.

It is self-evident that the corresponding measurements and tolerances are selected in a useful way such that a support via the coarse adjustment screw at the lever becomes absolutely necessary to reach the desired position.

After this coarse adjustment has been made, the differential screw is actuated which now pulls up the first end of the lever towards the cartridge or pushes the same away there from, while said other end of the lever is supported by the tool body. This also raises or lowers the abutment point for the coarse abutment screw by a corresponding lever transmission ratio, which depends on ratio of the corresponding lever lengths, i.e. the distance of the second lever end supported by the tool body to the abutment point of the coarse adjustments crew on the one hand and the distance of the second lever end to the threaded hole of the fine adjustment screw at the other, first lever end on the other hand. A lever ratio of 1:4 may be useful such that the movement of the lever end caused by the differential screw by a factor 4 is transmitted to the coarse adjustment screw and thus the moveable portion of the cartridge.

Such fine adjustment via a differential screw and a lever has the advantage that in contrast to a wedge adjustment, every movement of the cutting edge is rather continuous and even, whereas any static friction as occurring between wedge surfaces and abutment surfaces often leads to jerky, discontinuous changes of position. When it comes to differential screws of the same direction, any jerky movements caused by static friction effects are relatively weak and are further reduced by the lever.

Further advantages, features and applicabilities will become readily apparent by the following description of a preferred embodiment and the figures taken in connection therewith.

Figure 1:
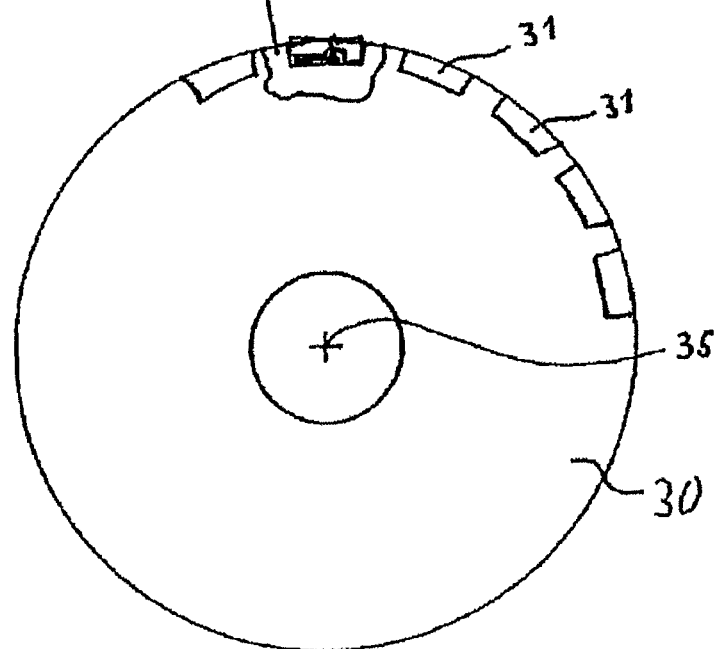
Figure 3:
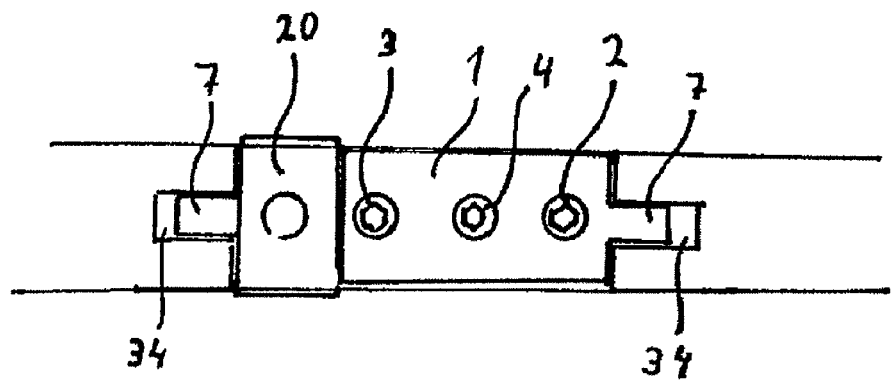
Figure 4:
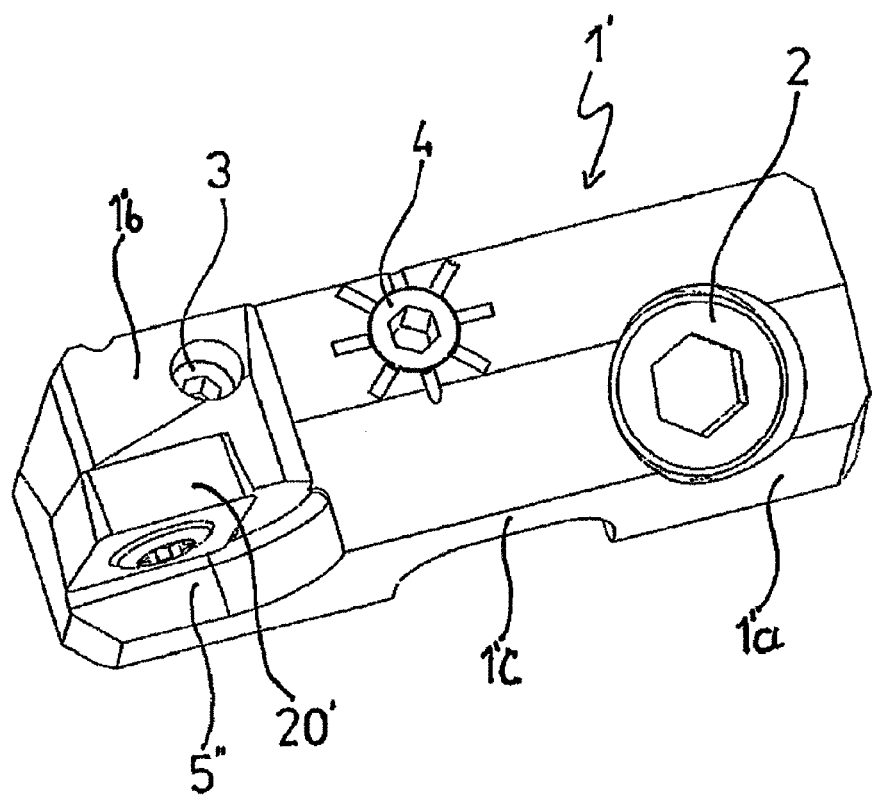
Figure 5:
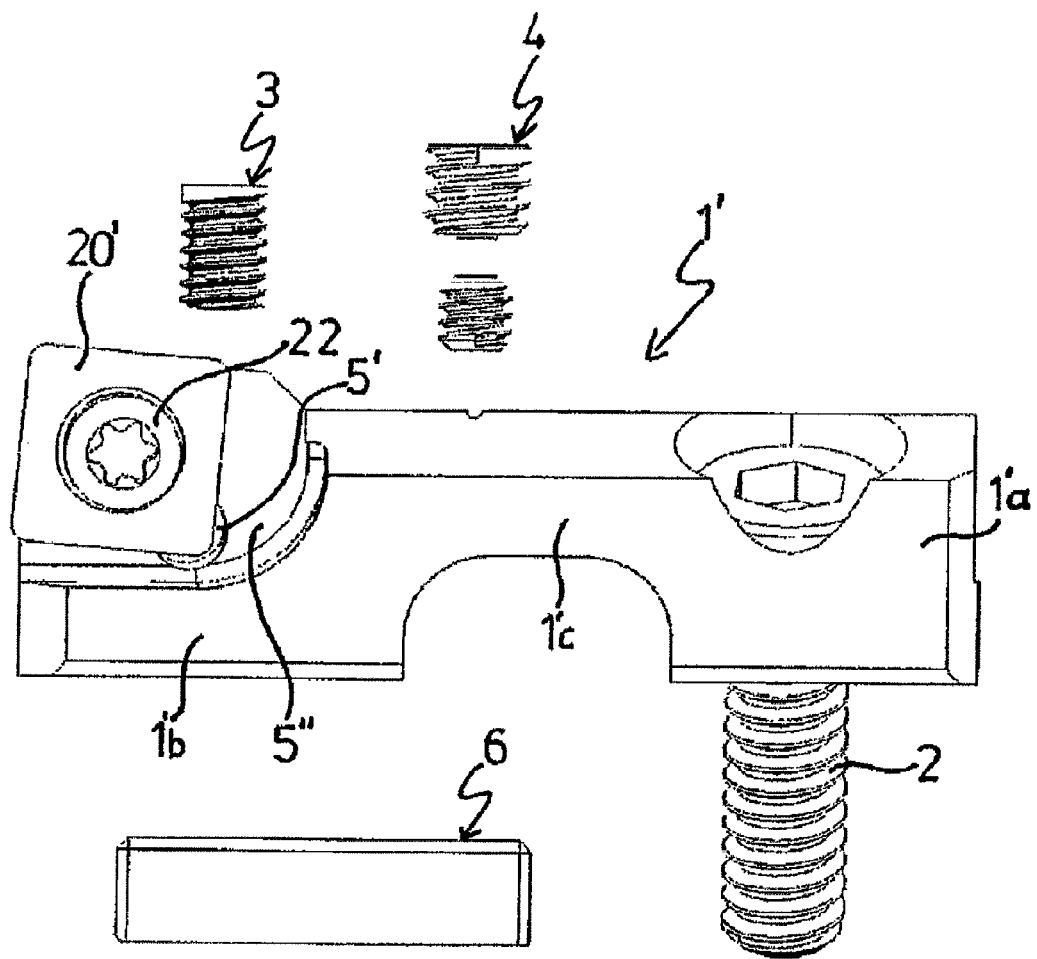
Figure 6:
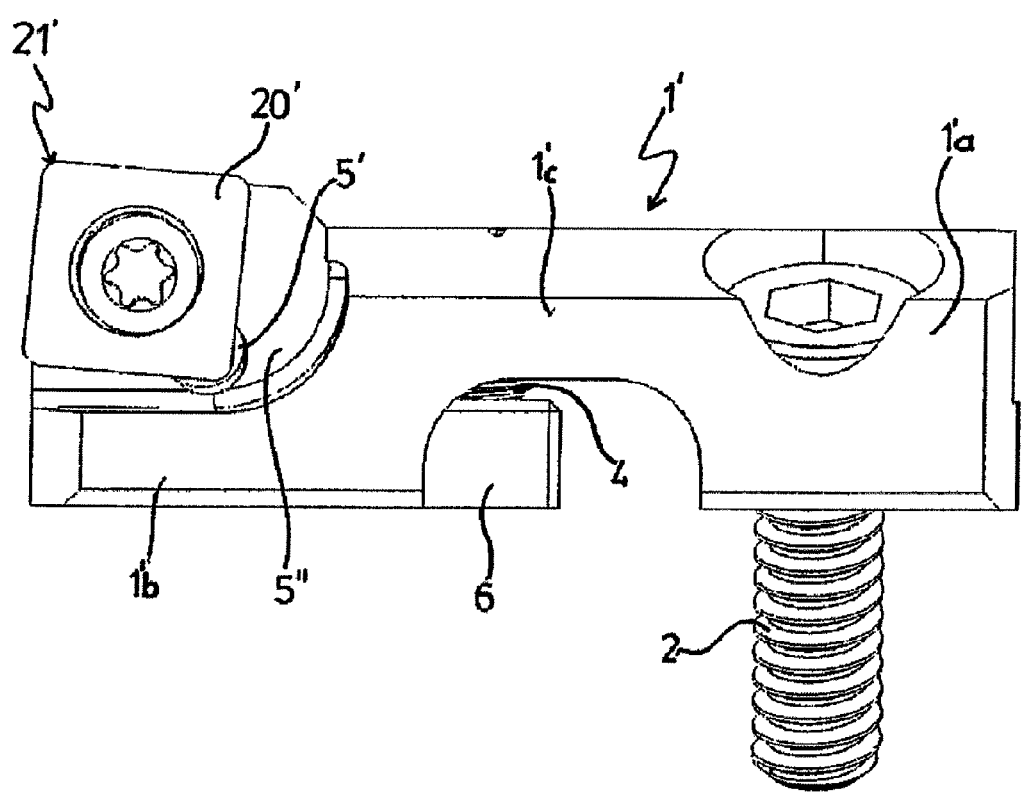
Figure 7:
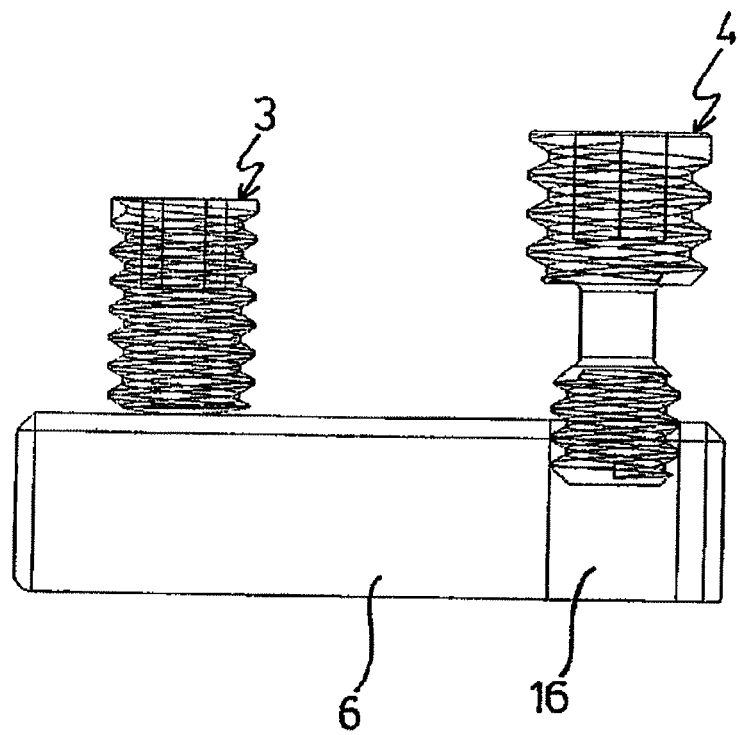
Figure 8:
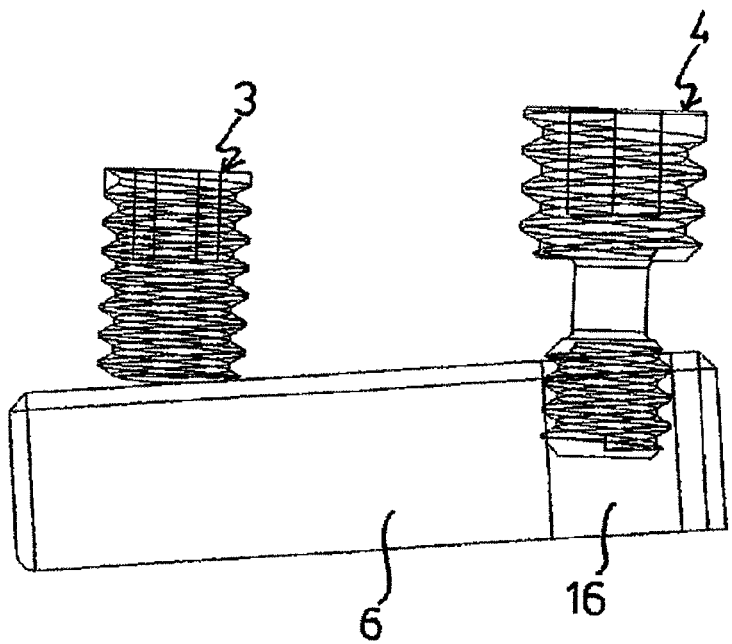
Figure 9:
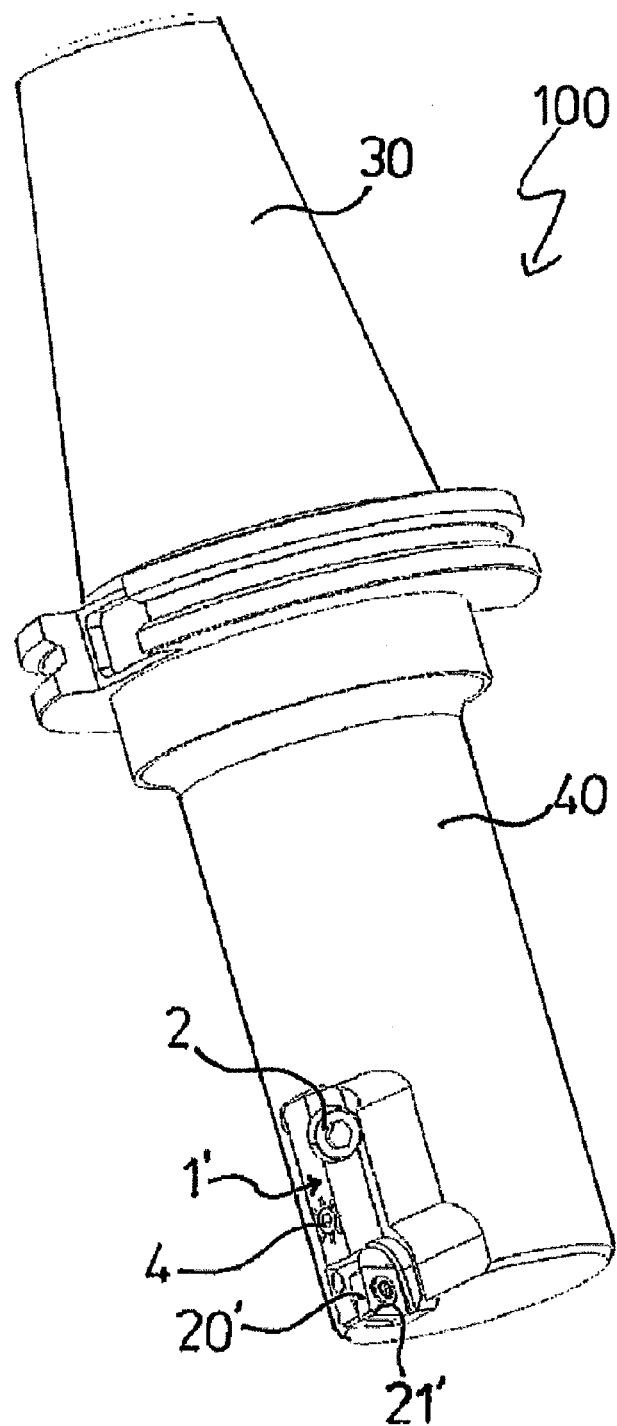

In the figures there is:

FIG. 1 a schematic depiction of a disc-shaped cutting tool with recesses at its periphery for receiving cartridges according to the invention, FIG. 2 an enlarged section of FIG. 1, and FIG. 3 a variant having lateral cartridge support, FIG. 4 an alternative embodiment of a cartridge according to the invention, FIG. 5 individual parts of the cartridge according to FIG. 4 in a lateral view, FIG. 6 the mounted cartridge according to FIG. 4 in a lateral view, FIGS. 7 and 8 the principle of the adjustment of the lever through coarse adjustment screws and fine adjustment screws and FIG. 9 a precision finish boring tool with a cartridge according to the invention.

FIG. 1 schematically shows a tool body 30 in the form of a rotatable disc having recesses 31 for receiving cartridges (1), whereby only a few recesses are drawn at the periphery of the tool body in the schematic depiction of FIG. 1, only one of which being assembled with a corresponding cartridge 1 in this schematic figure.

FIG. 2 shows the section of the tool body 30 assembled with the cartridge 1 in an enlarged depiction.

At first, the tool body 30 shows a threaded hole 32 for receiving a mounting screw 2 in an abutment surface 33 formed by the bottom of the recesses 31. The cartridge 1 essentially consists of an elongate, almost bar-shaped element schematically depicted in the figure with a stationary mountable portion 1a and a portion 1b being elastically bendable with respect to the stationary and in this case rigid portion 1a, whereby the ability to bend is caused by a material bridge 1c between the portions 1a and 1b having a correspondingly smaller material cross-section, especially when compared to rigid portion 1a. The cartridge 1 preferably consists of tool steel, wherein also other materials common for tools are not excluded.

There is provided a pocket 5 for receiving a cutting insert 20 at the end of the portion 1b being displaced from stationary portion 1a, the cutting insert being possibly fixed for example by means of a screw engaging a threaded hole of movable portion 1b which is not described herein in detail.

The cartridge serves for a coarse and fine adjustment of the position of the cutting edge 21 of the cutting insert 20, more precisely of the exact radial distance of the cutting edge 21 from an axis 35 of the tool body 30.

For this adjustment option, there are provided a coarse adjustment screw 3 in a thread 13, a differential screw 4 for fine adjustment in threads 14 and 16 and a lever 6 having a thread for a portion of the differential screw at its first end, the second 6' of which being supported by the bottom 33 of the recess 31 of the tool body 30. A point or a small portion on the upper side of the lever 6 between the second end of the lever and the threaded hole at the first end serves as abutment 6" for the coarse adjustment screw 3. Parallel to the thread 13 of the coarse adjustment screw 3, a threaded hole 14 for receiving a portion of the differential screw 4 extends through the cartridge 1 and in the present case through the bridging portion 1c.

It goes without saying that the threaded hole 14 does not necessarily have to be provided in the bridging portion 1c of cartridge 1, but may be provided outside of the bridging portion 1c either in the moveable portion 1b or in the stationary portion 1a as long as there is enough space left underneath threaded hole 14 and moveable portion 1b for receiving lever 6 and a allowing a limited movement thereof between the abutment surface 33 and the corresponding portions of cartridge 1.

Before mounting of a cartridge, coarse adjustment screw 3, differential screw 4 and lever 6 may already be pre-mounted such that differential screw 4 keeps lever 6 at a certain distance underneath moveable portion 1a of cartridge 1, whereby this distance may be around 1 mm. The coarse adjustment screw 3 may be lightly pressed against lever 6 as lock screw, such that the lever is effectively kept at cartridge 1 and is not loosely moveable.

The stationary portion 1a is then fixed to the bottom 33 of the recess 31 by means of a mounting screw 2. When the end 6' of the lever 6 hits the bottom 33 of the recess 31, the moveable end 1b is pressed up and away from the bottom 33 of the recess 31 by means of the lever 6, the abutment 6" and the coarse adjustment screw 3 which is situated in the thread. If the end of the lever 6' should then still have no contact with the bottom 33 of the recess 31 after fixing of the portion la, the end of the lever 6' may be lowered by actuating the differential screw 4 and/or adjusting the coarse adjustment screw 3 such that the lever gets in contact with the bottom 33 of the recess 31, whereas at the same time the coarse adjustment screw 3 presses onto the abutment point 6" and the other end of the lever 6 is kept at the cartridge by the differential screw 4.

It is useful to select the dimensions and tolerances of the recess 31 and the cartridge in a way that the cutting edge 21 is still within a desired adjustment radius, when the lever 6 extends parallel to the abutment surface 33 at a very flat angle under slight pretension through the coarse adjustment screw 3 and the second end of the lever is supported by the abutment surface of the tool body.

In order to enlarge the radial distance of the cutting edge 21 to the axis 35 of the tool body 30, the coarse adjustment screw 3 is actuated which is supported by the abutment point 6" of the lever 6 and thereby pushes the movable portion 1b of the cutting edge 21 radially outward. Thereby an elastic bending stress occurs in the bridging portion 1c, which works against the coarse adjustment screw 3 such that the cutting edge 21 is essentially rigid after the adjustment by both counteracting forces. Additionally, a fine adjustment of cutting edge 21 may be performed by actuating the differential screw 4. Actuating the differential screw 4 leads to a rising or lowering—depending on the direction of rotation—of the end of the lever 6 comprising the threaded hole 16, such that together with the lever transmission, the abutment 6" of the coarse adjustment screw moves radially outward or inward. Due to the fact that a differential screw 4 is used having threads of the same direction, but different slopes, whereby there is additionally provided a lever reduction due to the different distances of the thread 16 and of the abutment 6' to the abutment end 6' of the lever, a very fine and precise adjustment of the radial position of the cutting edge 21 is possible.

It should be understood that apart from this radial adjustment of the cutting edge, additional adjustments or fixations with respect to the axial position of the cutting edge (with regard to axis 35) may be provided. For example, only short receiving slots extending in circumferential direction could be provided in the top view of the circumference of the disc- or cylinder-shaped tool body 30 which radially extend outward and which are open to the recesses 31, such that corresponding pegs extending from the front sides of the stationary portions 1a or of the moveable portion 1b may be fittingly received therein. In this way, an additional securing and guiding of the cartridge and especially of the end of the cartridge in the recess 31 having the cutting edge 21 is obtained.

Such a variant is for example depicted in FIG. 3 as section of a top view onto the periphery of a disc-shaped tool body 30 and cartridge 1 received at the tool body 30.

The slots 34 are shown there as extensions of the recess 31 in circumferential direction in which fitting pegs 7 are received forming extensions from the front faces of the cartridge 1 and ensuring a precise lateral guiding of the ends of the cartridges in transverse direction.

It is clear that regarding mounting screw 2, the peg 7 and the slot 34 on the side adjacent to the mounting screw may be omitted, because the screw 2 already causes the fixation of the stationary mountable portion 1a of the cartridge in all directions.

It is clear that the cutting insert 20 does not necessarily have to extend over the full axial length or height of the tool body 30, but can also be fixed to an axially extended tool body 30, whereby the corresponding recess 31 of the tool body may already form an at least one-sided guiding and abutment surface for the cartridge 1 such that the slots 34 and the peg 7 could then be readily omitted as well.

Another cartridge 1', such as for instance to be used for a precision finish boring tool according to FIG. 9, is shown in FIGS. 4 to 6. In FIG. 4 the cartridge is shown in a perspective view from one side thereof which, when mounted, substantially corresponds a radial top view onto a tool equipped with such a cartridge.

A side view showing individual members of the cartridge and a further side view showing the same in a mounted condition are shown in FIGS. 5 and 6, respectively.

In as far as the individual components of the cartridge 1' are identical to those of cartridge 1, the same reference numerals have been used. Dashed reference numerals indicate that the corresponding component may comprise a slightly different arrangement or shape when compared to those of the cartridge 1.

As opposed to the cutting insert of the cartridge 1 according to FIGS. 1 through 3, the cutting insert 20' in this case is mounted radially rather than tangentially, i.e. the rake face extends substantially in a radial plane including the axis, notwithstanding any positive or negative radial rake angles.

The cartridge 1' is distinguished from the cartridge 1 substantially by the relative arrangement of the recess 5' for receiving the cutting insert 20' and a corresponding chip space 5" provided in front of the receiving recess in the section 1'b of the cartridge 1' in front of the receiving recess and a correspondingly mounted cutting insert 20'.

The fine adjustment screw 4 and the coarse adjustment screw 3 are arranged slightly offset from a longitudinal central plane extending through the cartridge 1' parallel to the axes of the screws, when the fixing screw 2 extending through the portion 1'a is offset towards the opposite direction.

The offset arrangement of adjustment screws 3 and 4 corresponds to a correspondingly offset arrangement of the lever 6 which thereby may be provided within a cavity on the bottom side of the cartridge without said cavity interfering with the cutting insert 20' and the recess receiving the same.

FIG. 5 again shows some details of the cartridge 1' in a side view. As will be seen, also this cartridge is comprised of three different portions, namely the fixing portion 1'a, the adjustment portion 1'b and the bridge portion 1'c. The fixing portion 1'a is fixedly mounted by means of the fixing screw 2 in a corresponding cavity of a tool provided for receiving the cartridge 1'. The upper fine adjustment screw 4 extends into a first threaded bore 14 (cf. FIG. 2) in cartridge portion 1'c, and, by means of its lower thread portion into a second threaded bore 16 (cf. FIG. 2) provided within the lever 6. The two threaded portions of screw 4 and the corresponding threaded bores 14, 16 have a different pitch for providing the fine adjustment.

The coarse screw 3 extends through a female thread in the cartridge portion 1'b. In a cavity at the bottom side of the cartridge 1' and the portion 1'b thereof, respectively, which is not visible in FIGS. 5 and 6, the lever 6 is received as is particular to be recognized from FIG. 6. In FIG. 6 the lever 6 is fixedly mounted onto the cartridge 1' by means of the fine adjustment screw 4' and partially extends into the free space or recess below the bridge portion 1'c and partially into the cavity at the bottom side of the portion 1'b, which portion 1'b also includes the recess 5' for receiving the cutting insert 20' which is arranged (when seen in a cross-section of the cartridge) diagonally opposite of said cavity.

Also in this case a particular radial distance of the projecting cutting corner 21' of cutting insert 20' from a tool axis is preliminary adjusted and thereafter, said radial distance is further adjusted by actuating the fine adjustment screw 4 and thereby privoting the lever 6.

This adjustment principle is again shown in FIGS. 7 and 8. In FIG. 8 there is shown the lever 6, the left end of which is supported on a support surface (not shown). At the same time, the more or less rounded tip of the coarse screw 3 is in engagement with the surface of the lever 6 opposite of the bottom side thereof.

The lower thread portion of the fine adjustment screw 4 is in engagement with the female thread 16 at the right hand end of the lever 6. The upper thread portion of the fine adjustment screw 4 is in engagement with a thread provided in the cartridge just as is the coarse screw.

The thread pitches of the two thread portions of adjustment screw 4 (only schematically represented in the present figures) are selected such that upon screwing the lower thread portion further into the female thread 16 of the lever 6, the right-hand end of the lever is pulled up more closely towards the cartridge body which in turn results in raising of the right-hand end of the lever, while the left-hand end of the lever is supported by a support (not shown in the figures). Accordingly, also the coarse screw 3 is raised by an amount corresponding to the transmission ratio of the respective lever sections and in turn raises also the portion 1'b of the cartridge by engagement with the threaded bore 13. Thereby, also the cutting corner 21' of the cutting insert 20 is further extended from the support surface for the lever and is thereby adjusted to a desired radial distance (wherein there is assumed that the axes of the adjustment screws extend more or less along the radial direction of a corresponding tool or have at least a corresponding component).

As will be appreciated, the relative movements shown in FIGS. 7 and 8 are strongly exaggerated and merely shown in a schematic manner. Typically, the total amount of adjustment of the right-hand end of the lever at the position of the thread 16 will be in the order of at most 1 mm, so that the coarse adjustment screw 3 is shifted together with the respective cartridge portion 1b and 1'b, respectively, only by a corresponding fraction of 1 mm.

Finally, FIG. 9 shows a cartridge according to the embodiment displayed in FIGS. 4 to 6 arranged in a corresponding recess of a finish boring tool. The cartridge might as well be used with a precision reamer tool. It goes without saying that a plurality of corresponding cartridges might be arranged on the tool shaft, along both, the axial as well as along the circumferential direction, wherein the cutting edges or cutting corners thereof are each individually adjustable in order to be able to produce highly precise drilling holes. The finish boring tool 100 as shown in FIG. 9 substantially corresponds of a chuck end 30, which in the present case is shown as a conical shaft and a shaft 40, comprising at least one recess for receiving corresponding cartridges 1' and 1, respectively, For the purpose of original disclosure it is to be noted that any features which may be gathered by a skilled person from the present description, the drawings and the claims, even if only described in connection with particular further features, may be combined individually as well as in arbitrary combinations with any other of the features or groups of features disclosed herein, unless this is explicitly excluded or technical conditions would render such combinations impossible or senseless. The comprehensive, explicit discussion of any combinations of features which might be thought of is dispensed with just for the sake of brevity and legibility of the description and claims.

What is claimed is:

1. Cartridge for supporting at least one cutting insert and for being received on a tool body wherein at least a first portion of the cartridge provides means for a stationary mounting on the tool body and the cartridge comprises at least one pocket for receiving a cutting element, wherein a coarse and a fine adjustment means are provided for moving at least a second portion of the cartridge comprising the pocket with respect to the tool body, wherein the coarse and the fine adjustment means are part of the cartridge, and wherein the coarse and fine adjustment means are provided independently of the stationary mounting of the first portion of the cartridge at a fixed position.

2. Cartridge according to claim 1, wherein the movement of the moveable portion by means of the fine adjustment screw is further transmitted via a lever.

3. Cartridge according to claim 1, wherein the fine adjustment comprises a differential screw.

4. Cartridge according to claim 1, wherein the coarse adjustment means comprises a screw by means of which the second portion is adjustable in position with respect to the tool body.

5. Cartridge according to claim 2, wherein said screws and corresponding bores of the coarse and fine adjustment means have substantially parallel axes and wherein the direction of movement of the moveable portion of the cartridge comprises an adjustment path running parallel to said axis.

6. Cartridge according claim 1, wherein the moveable and the stationary mountable portion of the cartridge are integrally connected via a bridge having a smaller cross-section of material than the stationary mountable portion, thereby facilitating elastic displacement of the moveable portion.

7. Cartridge according to claim 1, wherein the coarse screw is abutting a portion of said lever.

8. Cartridge according to claim 1, comprising at least one mounting hole for the stationary mountable portion.

9. Cartridge according to claim 1, wherein two threaded holes are provided within the cartridge, wherein a first one of said threaded holes is provided close to the pocket provided on the moveable portion remote from the stationary mountable portion, while the second threaded hole is provided between said first threaded hole and the stationary mountable portion.

10. Cartridge according to claim 9, wherein said first threaded hole is provided for a coarse adjustment screw.

11. Cartridge according to claim 9, wherein second threaded hole is provided for one of the threads of a differential screw.

12. Cartridge according to claim 9, wherein said lever is provided between an abutment surface of the tool body and the moveable portion of the cartridge, wherein a threaded bore is provided in said lever close to the first end thereof for receiving a second thread of the differential screw, while an intermediate point of said lever closer to the second end of said lever is engaged by the coarse adjustment screw.

13. Cartridge according to claim 11, wherein said second end of the lever is supported by an abutment surface of the tool body when said cartridge is mounted on said tool body.

14. Cartridge according to claim 1, comprising additional retaining and guiding elements for positioning the cartridge in a direction perpendicular to the adjustment path.

15. Cartridge according to claim 2, wherein said screws and corresponding bores of the coarse and fine adjustment means have substantially parallel axes and wherein the direction of movement of a pocket on said moveable portion receiving a cutting insert comprises an adjustment path running parallel to said axis.

16. Cartridge according to claim 3, wherein said screws and corresponding bores of the coarse and fine adjustment means have substantially parallel axes and wherein the direction of movement of the moveable portion of the cartridge comprises an adjustment path running parallel to said axis.

17. Cartridge according to claim 3, wherein said screws and corresponding bores of the coarse and fine adjustment means have substantially parallel axes and wherein the direction of movement of a pocket on said moveable portion receiving a cutting insert comprises an adjustment path running parallel to said axis.

* * * * *